United States Patent [19]

Hartley et al.

[11] 4,287,387

[45] Sep. 1, 1981

[54] TELETYPEWRITER LOOP SWITCHING MATRIX

[75] Inventors: Robert R. Hartley, Niantic; Joseph A. Konrad, New London, both of Conn.

[73] Assignee: The United States of America as represented by the Secretary of the Navy, Washington, D.C.

[21] Appl. No.: 101,292

[22] Filed: Dec. 7, 1979

[51] Int. Cl.³ .............................................. H04L 15/00
[52] U.S. Cl. ................................................... 178/2 R
[58] Field of Search .................... 178/74, 75, 2 R, 2 C, 178/2 D, 2 E, 3, 17 R; 340/147 G, 147 CN, 147 CV; 179/18 GF; 339/17 LM, 17 M, 18 C

[56] References Cited

U.S. PATENT DOCUMENTS

| | | | |
|---|---|---|---|
| 3,395,245 | 7/1968 | Harris | 178/3 |
| 3,588,320 | 6/1971 | Guzak, Jr. | 178/2 R |
| 3,867,567 | 2/1975 | Herron et al. | 178/3 |
| 4,107,474 | 8/1978 | Schneider | 179/18 GF |

Primary Examiner—Thomas A. Robinson
Attorney, Agent, or Firm—Richard S. Sciascia; Arthur A. McGill

[57] ABSTRACT

A system for interconnecting and switching teletypewriter or digital data signals when transmitted over any of the four universally accepted standard signal loops. The system incorporates a novel triple loop arrangement; an "IN" loop connected to a signal source, an "INTERNAL" loop to provide switching and an "OUT" loop connected to the signal destination. Each "IN" loop or "OUT" loop together with half of its associated "INTERNAL" loop is implemented in a single printed circuit card. The system can incorporate any number of "IN" and "OUT" loops and the associated "INTERNAL" loops.

9 Claims, 1 Drawing Figure

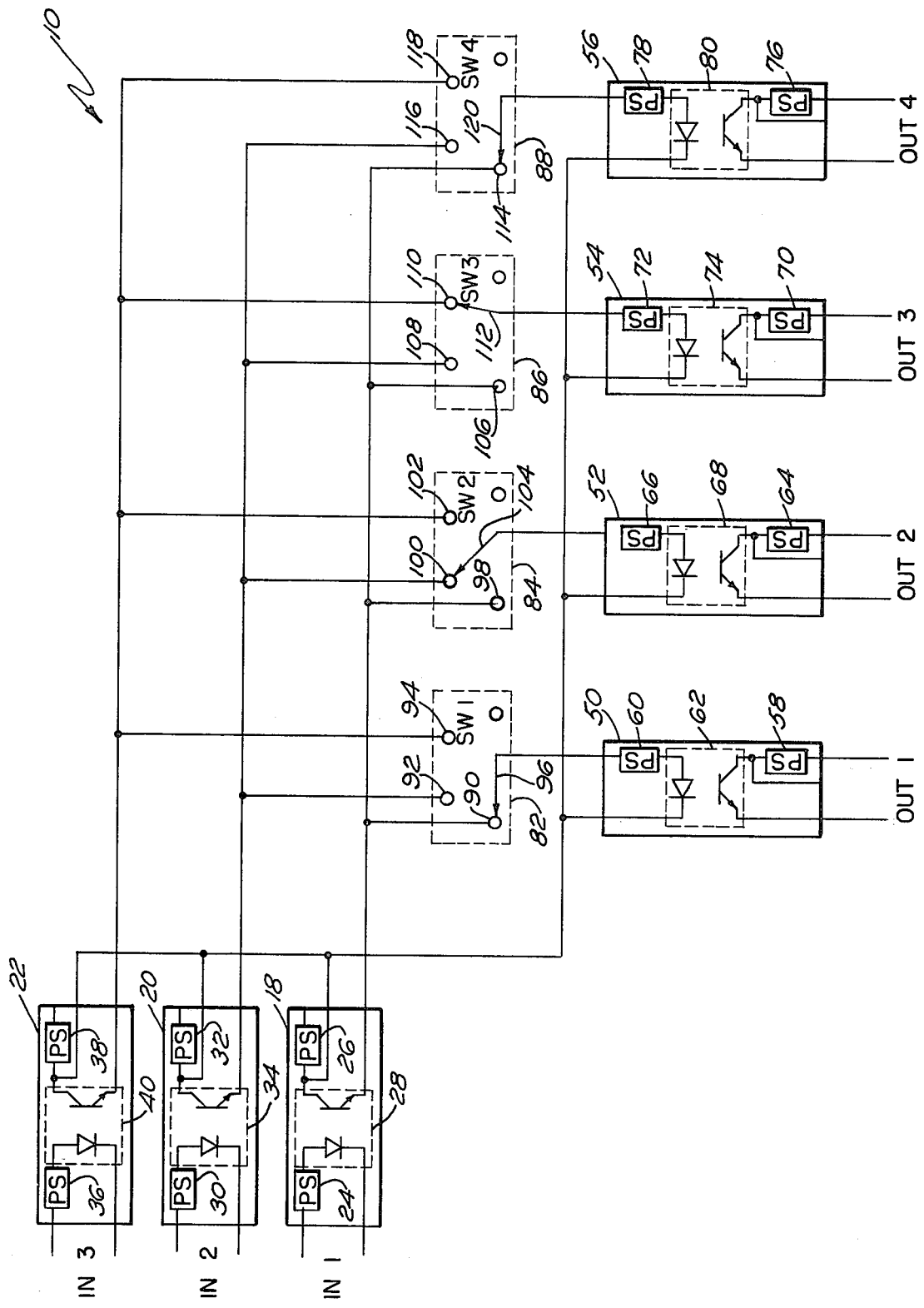

TELETYPEWRITER LOOP SWITCHING MATRIX

STATEMENT OF GOVERNMENT INTEREST

The invention described herein may be manufactured and used by or for the Governement of the United States of America for governmental purposes without the payment of any royalties thereon or therefor.

BACKGROUND OF THE INVENTION

This invention relates to a switching system for telecommunication and more particularly to a teletypewriter loop switching matrix for interconnecting and switching teletypewriter or data signals. Historically, teletypewriter signal loops have been characterized by a high D.C. voltage source (100 to 200 volts) in series with a resistance which could be adjusted to obtain either 20- or 60-milliampere current to operate the receiving equipment. This standard was primarily devised to operate teletypewriter units in a series connection for field applications. This arrangement permitted the operation of high resistance loops which could stretch over many miles of wire lines. These high voltage and high resistance circuits are also useful for maintaining a low bias distortion when driving high inductance selector magnets in teleprinters as well as a high signal-to-noise ratio in the presence of dirty distributor contacts or other noise sources. However, when the signal loops are confined to a fixed location, such as a structure, ship or submarine, and the selector magnets within the equipment are not driven directly, as in most existing equipment, there is no real requirement for high voltage current loops. Under such short fixed loop conditions, most of the power in the loop is dissipated in fixed or adjustable resistors within the equipment, which can cause heating problems in the equipment, Furthermore, the direct switching of one or more receiving devices to each sending device poses additional problems when a single series loop is used to interconnect the equipment. Since the loop current is a function of the impedances of the devices in series, it needs to be adjusted each time a device is switched in or out of the series loop. When devices requiring different loop currents or one of the bipolar standards are included in the system, the situation becomes impossible without the inclusion of special interface equipment required to meet the varying standard requirements. Most of the new equipment is configured for the low level bipolar standards. This causes a problem of interconnecting older devices operating on the current standards with the bipolar standards now in use. It is thus desirable to have a switching matrix which can overcome the above-mentioned problems.

SUMMARY OF THE INVENTION

A teletypewriter loop switching matrix according to the teachings of subject invention incorporates a novel triple loop arrangement; an "IN" loop connected to a signal source, an "INTERNAL" loop to provide switching and an "OUT" loop connected to the signal destination. Each "IN" or "OUT" loop together with half of its associated "INTERNAL" loop is implemented in a single printed circuit card. Since each "IN" or "OUT" loop and its associated printed circuit card are dedicated to a single piece of external equipment, the loop currents or voltages will not be a function of the switching configuration and should remain reasonably constant without readjustment. Since all the switching is performed on the "INTERNAL" loop, it prevents garbled copy from occurring on any receiving device other than the device being switched.

An object of subject invention is to provide a method of interconnecting various teletypewriter like equipments in a manner to give rapid complete flexibility in making changes within the system.

Another object of subject invention is to provide a teletypewriter loop switching matrix wherein any combinations of the standard loop arrangements can be used without affecting the overall performance of the equipment.

Still another object of subject invention is to have a teletypewriter loop switching matrix which requires less power to operate the system and dissipates far less power in terms of heat.

Other objects, advantages and novel features of this invention will become apparent from the following detailed description of the invention when considered in conjunction with the accompanying single figure which shows an embodiment of a teletypewriter loop switching matrix built according to the teachings of subject invention.

BRIEF DESCRIPTION OF THE DRAWING

The FIGURE shows an embodiment of a teletypewriter loop switching matrix in accordance with the present invention.

DESCRIPTION OF A PREFERRED EMBODIMENT

Referring to the drawing wherein like reference characters designate like parts throughout, the single FIGURE shows the block diagram of a 3×4 teletypewriter loop switching matrix 10. It should be noted that this 3×4 teletypewriter loop switching matrix is shown for descriptive purposes only without any limitation on the number of devices that can be interconnected in this manner. The only limitation on the number of devices that can be interconnected in this manner is the number of switches, switch positions and circuit cards available. The switching matrix loop 10 includes three input loops; IN 1, IN 2, IN 3; and four output loops; OUT 1, OUT 2, OUT 3, OUT 4; and four rotary switches each having a wiper arm and four contact points. Inputs IN 1 includes printed circuit card 18, IN 2 includes printed circuit card 20 and IN 3 includes printed circuit card 22. Printed circuit card 18 includes power supplies 24 and 26, and optical isolator 28 which drives the corresponding "INTERNAL" loop. Printed circuit card 20 includes power supplies 30 and 32 and optical isolator 34 which drives the corresponding "INTERNAL" loop. Printed circuit card 22 incudes power supplies 36 and 38 and optical isolator 40. Each of the output loops; OUT 1, OUT 2, OUT 3 and OUT 4 has one printed circuit card 50, 52, 54 and 56 respectively. Printed circuit card 50 includes power supplies 58, 60 and optical isolator 62 which drives the corresponding "OUT" loop. Printed circuit card 52 includes power supplies 64, 66 and optical isolator 68 which drives the corresponding "OUT" loop. Printed circuit card 54 includes power supplies 70 and 72 and optical isolator 74 which drives the corresponding "OUT" loop. Printed circuit card 56 incudes power supplies 76 and 78 and optical isolator 80 which drives the corresponding "OUT" loop. Rotary switch 82 corresponds to output loop "OUT 1" and switch 84 corresponds to output loop "OUT 2" and switch 86 corresponds to output loop "OUT 3" and switch 88 corresponds to output loop "OUT 4". Switch 82 has contact points 90, 92 and 94 and wiper arm 96. Switch 84 has contact points 98, 100 and 102 and wiper arm 104. Switch 86 has contact points 106, 108, 110 and wiper arm 112 and switch 88 has contact points 114, 116, 118 and wiper arm 120. The signals on each of the input loops are generated by external equipments such as radio receivers or keyboards. Each of the "IN" and "OUT" loops goes to individual printed circuit cards 18, 20, 22, 50, 52, 54 and 56 respectively. For description purposes the current loop configuration of the printed circuit cards are shown in the "IN" loop and "OUT" loops. The bipolar configuration functions in an analogous manner. It is to be noted that each of the "INTERNAL" loops includes the output of the optically coupled isolator which is within the input printed circuit card, switch contacts and the regulated power supply and the input of another optically coupled isolator within the output printed circuit card. Each of the output printed circuit cards 50, 52, 54 and 56 supplies regulated power to drive the "INTERNAL" loop using a common ground. The signal from each printed circuit card is routed directly to the same switch position on a number of individual rotary switches. As shown, any input signal can be routed to any number of switch outputs. Each switch wiper is wired directly to an individual output printed circuit card. The "OUT" loop includes an optically coupled isolator and a dedicated power supply within the output circuit card and is completed within the external equipment to be driven. Input circuit cards or output circuit cards in either configuration are interchangeable. Since the "IN" and "OUT" loops are electrically independent of each other any mixture of 20 or 60 milliampere current loops or low voltage level biploar loops can be accommodated. Furthermore, associated external equipment should require no periodic adjustments. On the configuration, as shown in the figure, any of the input "IN" loops can be connected to any of the "OUT" loops and consequently any of the input signals can be connected to drive any or all of the output equipments.

Briefly stated, teletypewriter loop switching matrix incorporating a novel triple loop arrangement, an "IN" loop connected to a signal source, an "INTERNAL" loop provides switching and an "OUT" loop connected to a signal destination is provided. Each "IN" or "OUT" loop together with half of its associated "INTERNAL" loop is implemented in a single printed circuit card. The system provides any number of "IN" loops and "OUT" loops which are controlled by the number of devices that can be interconnected in the number of positions and circuit cards available.

Obviously, many modifications and variations of the present invention are possible in the above teachings. As an example, the number of "IN" loops and "OUT" loops and "INTERNAL" loops can be varied without deviating from the teachings of subject invention. Furthermore, the optical isolator used can be any of the off-shelf and commercially available items which can be interchanged without deviating from the teachings of the subject invention. It is therefore understood that within the scope of the appended claims the device may be practiced otherwise than specifically described.

We claim:

1. A system for interconnecting and switching teletypewriter signals which comprises:
   a first plurality of "IN" loops with each member thereof receiving the teletypewriter signals from a corresponding member of a plurality of sources of the teletypewriter signals;
   a second plurality of "INTERNAL" loops with each member thereof having a first half interfaced with a corresponding member of said first plurality of "IN" loops; and
   a third plurality of "OUT" loops with each member thereof connected to a plurality of receivers of the teletypewriter signals and each member thereof being interfaced with a second half of a corresponding member of said second plurality of "INTERNAL" loops.

2. The system of claim 1 wherein each member of said first plurality of "IN" loops includes a printed circuit card.

3. The system of claim 2 wherein said printed circuit card includes an optical isolator for isolating noise from one member of said first plurality of "IN" loops to the remaining "IN" loops thereof.

4. The system of claim 2 wherein each member of said first plurality of "IN" loops further includes a pair of power supplies for providing power to the optical isolator thereof.

5. The system of claim 3 wherein each member of said third plurality of "OUT" loops includes a light sensitive isolator and a pair of power sources to energize the light sensitive isolator thereof.

6. The system of claim 5 wherein each member of said second plurality of "INTERNAL" loops includes half of the corresponding members of said first plurality of "IN" loops and half of the corresponding members of said plurality of "OUT" loops.

7. The system of claim 6 wherein each member of said second plurality of "INTERNAL" loops includes switching means for interconnecting a member of said first plurality of "IN" loops and any desired member of said third plurality of "OUT" loops.

8. The system of claim 1 wherein said first plurality of "IN" loops are electrically isolated from said second plurality of "INTERNAL" loops and said third plurality of "OUT" loops, and said second plurality of "INTERNAL" loops are electrically isolated from said third plurality of "OUT" loops, each of said "IN" loops, "OUT" loops and "INTERNAL" loops having its own active power supply.

9. A system for interconnecting and switching teletypewriter signals comprising:
   a first and second plurality of identical printed circuit boards having identical components connected identically, with each circuit board comprising first and second power supplies separated by an optical isolator; and
   switching means connected between said first and second plurality of printed circuit boards for selectively connecting first printed circuit boards to second printed circuit boards.

* * * * *